United States Patent
Magowan

[11] Patent Number: 5,340,278
[45] Date of Patent: Aug. 23, 1994

[54] ROTOR BLADE WITH INTEGRAL PLATFORM AND A FILLET COOLING PASSAGE

[75] Inventor: John W. Magowan, Longmeadow, Mass.

[73] Assignee: United Technologies Corporation, Hartford, Conn.

[21] Appl. No.: 980,826

[22] Filed: Nov. 24, 1992

[51] Int. Cl.⁵ .............................................. F01D 5/04
[52] U.S. Cl. ................................ 416/96 R; 416/97 R
[58] Field of Search ................... 415/115, 116; 416/95, 416/96 R, 97 R

[56] References Cited

U.S. PATENT DOCUMENTS

| | | | |
|---|---|---|---|
| 2,737,366 | 3/1956 | Ledinegg | 253/39.15 |
| 3,066,910 | 12/1962 | Bluck | 253/39.15 |
| 3,446,481 | 5/1969 | Kydd | 253/39.15 |
| 3,446,482 | 5/1969 | Kydd | 253/39.15 |
| 4,017,213 | 4/1977 | Przirembel | 416/97 |
| 4,672,727 | 6/1987 | Field | 29/156.8 |
| 5,122,033 | 6/1992 | Paul | 416/96 R |

FOREIGN PATENT DOCUMENTS

| | | | |
|---|---|---|---|
| 1024754 | 2/1958 | Fed. Rep. of Germany | 416/95 |
| 742288 | 2/1952 | United Kingdom . | |
| 0791751 | 12/1954 | United Kingdom | 416/96 |
| 2070147 | 2/1981 | United Kingdom | 106/416 |

Primary Examiner—Edward K. Look
Assistant Examiner—Mark Sgantzos

[57] ABSTRACT

A rotor blade having an integral platform with a cooled fillet is disclosed. Various construction details are developed which provide a cooling hole extending in proximity of the fillet to convectively cool the fillet. In a particular embodiment, a rotor blade having a integral platform and fillet includes a cooling hole extending between an internal cooling passage and a damper cavity. The cooling hole has a streamwise axis oriented in the direction to a line tangent to a midpoint of the fillet. The cooling hole directs a flow of cooling fluid radially inward and laterally outward, the cooling fluid flowing in proximity to the fillet to provide convective cooling.

8 Claims, 2 Drawing Sheets

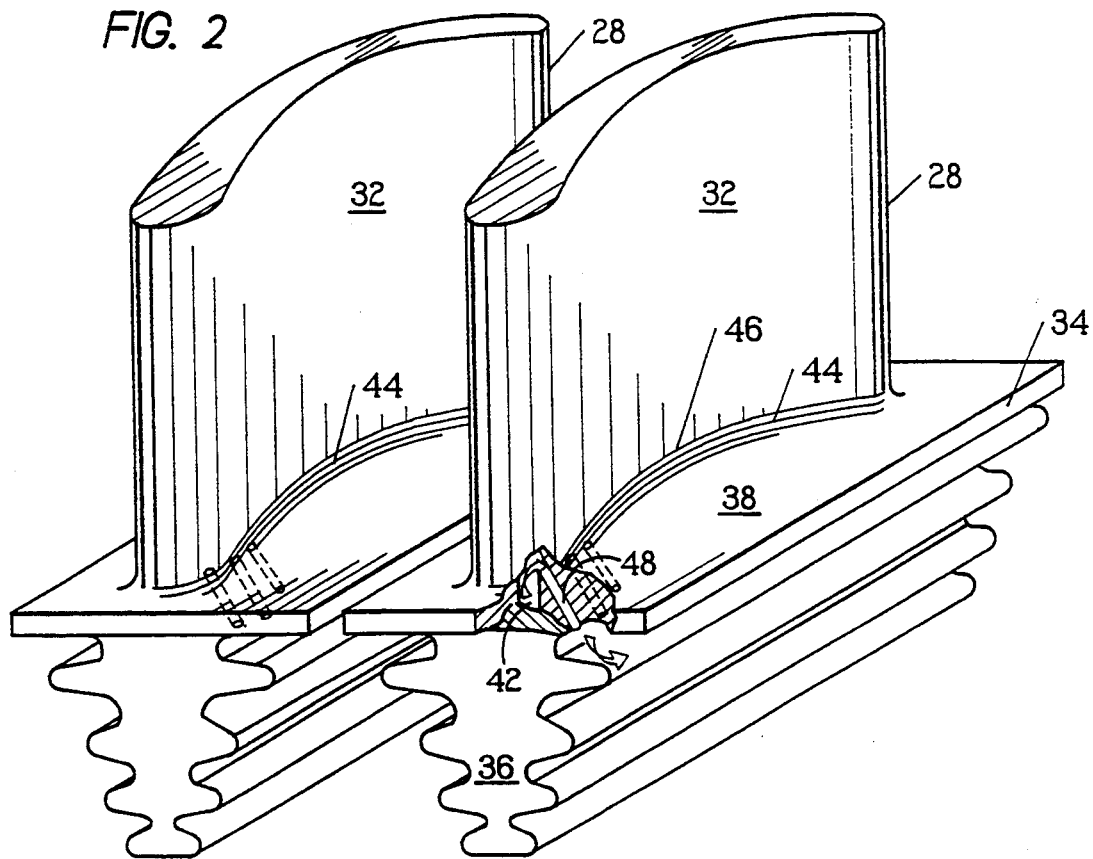
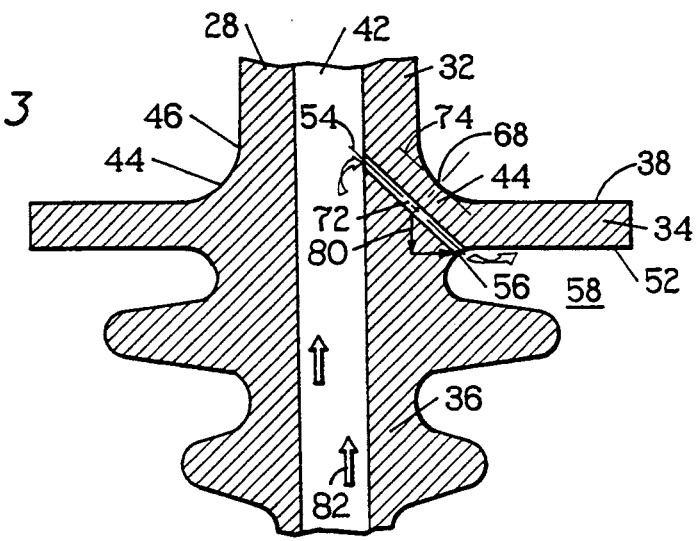

ROTOR BLADE WITH INTEGRAL PLATFORM AND A FILLET COOLING PASSAGE

TECHNICAL FIELD

This invention relates to gas turbine engines, and more particularly to rotor blades having integral platforms.

BACKGROUND OF THE INVENTION

A typical gas turbine engine has an annular axially extending flow path for conducting working fluid sequentially through a compressor section, a combustion section, and a turbine section. The compressor section includes a plurality of rotating blades which add energy to the working fluid. The working fluid exits the compressor section and enters the combustion section. Fuel is mixed with the compressed working fluid and the mixture is ignited to add more energy to the working fluid. The resulting products of combustion are then expanded through the turbine section. The turbine section includes another plurality of rotating blades which extract energy from the expanding fluid. A portion of this extracted energy is transferred back to the compressor section via a rotor shaft interconnecting the compressor section and turbine section. The remainder of the energy extracted may be used for other functions.

Each of the rotor blades includes an airfoil portion, a root portion, and a platform. The airfoil portion extends through the flow path and interacts with working fluid to transfer energy between the rotor blade and working fluid. The root portion engages the attachment means of the disk. The platform is typically integral to the rotor blade and extends laterally from the rotor blade to a platform of an adjacent rotor blade. The platform is disposed radially between the airfoil portion and the root portion. The platform includes a radially outward facing flow surface. The plurality of platforms extends circumferentially about the longitudinal axis of the gas turbine engine to define a radially inner flow surface for working fluid. This inner flow surface confines working fluid to the airfoil portion of the rotor blade.

As a result of the rotation of the rotor blade and its lateral extension, the region of the attachment of the platform to the root portion and airfoil portion of the rotor blade is subject to significant stress. To accommodate this stress, a fillet is located in the region of the attachment to prevent a stress concentration from occurring. Additionally, the fillet provides an aerodynamically smooth transition between the platform and the airfoil portion of the rotor blade.

A significant amount of cracking has been noticed to occur in the fillet, especially in the region of the leading edge of the airfoil portion. The cracks may result in the rotor blade being replaced at a higher frequency than desired. It is believed that high temperatures encountered by the fillet along the leading edge heat up the fillet. The heating of the fillet results in significant thermal stress and reduces the allowable stress of the fillet below an acceptable level.

Placing cooling holes in or near the fillet to provide film cooling over the fillet is a possible solution. The flow dynamics in the region of the leading edge fillet, however, make this difficult to do successfully. In addition, placing cooling holes through the fillet surface may increase the local stress because of the stress concentration associated with each hole.

The above art notwithstanding, scientists and engineers under the direction of Applicants' Assignee are working to develop effective cooling means for rotor blade platforms.

DISCLOSURE OF THE INVENTION

According to the present invention, a rotor blade includes a fillet adjoining a platform and airfoil portion and a cooling passage extending between core passage and an under platform cavity, the cooling passage providing convective cooling to fillet.

According further to the present invention, the cooling passage includes a downstream extending longitudinal axis which is parallel to a tangent through a cross-sectional midpoint of the fillet surface adjacent to the cooling passage.

According to a specific embodiment of the present invention, a rotor blade includes an airfoil portion, a root portion, a platform extending laterally from the rotor blade and disposed radially between the airfoil portion and the root portion, a fillet extending about the airfoil portion and adjoining the airfoil portion and platform, a core passage extending through the airfoil and root portions, and a plurality of cooling passages extending between the core passage and a damper cavity disposed between adjacent rotor blades. Cooling fluid flows through the cooling passage in a radially inward and laterally outward direction from the core passage such that the flow rate through the cooling passage is dependant upon the pressure differential between the core passage and the damper cavity. Each of the cooling passages is oriented to be nearest the midpoint of the fillet surface and in-line with the direction of compressive stress at the midpoint nearest the cooling passage. Each cooling passage includes an inlet into the core passage and an outlet into the damper cavity. The outlet is located laterally outward of a second fillet disposed about the root portion and adjoining the platform and root portion.

A principle feature of the present invention is the cooling passage extending between the internal cavity and the under-platform cavity. Another feature is the orientation of the cooling passage relative to the direction of stress within the fillet. A further feature is the proximity of the cooling passage to the midpoint of the fillet surface. A feature of the specific embodiment is the location of the cooling passage outlet into the damper cavity. Another feature of the specific embodiment is the orientation of the flow direction within the cooling passage relative to the flow direction within the core passage.

A primary advantage of the present invention is the cooling provided to the fillet as a result of cooling fluid flowing through the cooling passage. Convective cooling occurs between the cooling fluid in the cooling passage and the region of the fillet near the cooling passage. Another advantage is the minimal effect of the cooling passage on the stress within the fillet as a result of the orientation of the cooling passage. Aligning the cooling passage with the direction of stress near the midpoint of the fillet minimizes the stress concentration of the cooling passage. A further advantage is the cooling provided to the midpoint as a result of the proximity of the cooling passage to the midpoint. This feature provides maximum cooling to a region of high stress to maintain the temperature in this region below the allowable temperature. An advantage of the specific embodiment is cooling of the platform as a result of the outlet ejecting core cooling fluid into the damper cavity. The outlet provides a source of cooling fluid to the damper cavity which may be used to cool the laterally outer regions of the platform. Another advantage of the specific embodiment is the minimized likelihood of cooling passage blockage as a result of the cooling passage flow being oriented opposite to that of the core passage. Having a cooling passage flow component opposite to the principle direction of flow within the core passage makes the flow through the cooling passage dependent on static pressure and minimizes the ingestion of cooling fluid particles into the cooling passage.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 2 is a perspective view of adjacent rotor blades with other rotor assembly structure removed for clarity and with a plurality of cooling passages indicated by dashed lines.

FIG. 3 is a sectional view of the rotor blade including arrows indicating the direction of fluid flow through the rotor blade and one of the cooling passages.

BEST MODE FOR CARRYING OUT THE INVENTION

Figure 1:
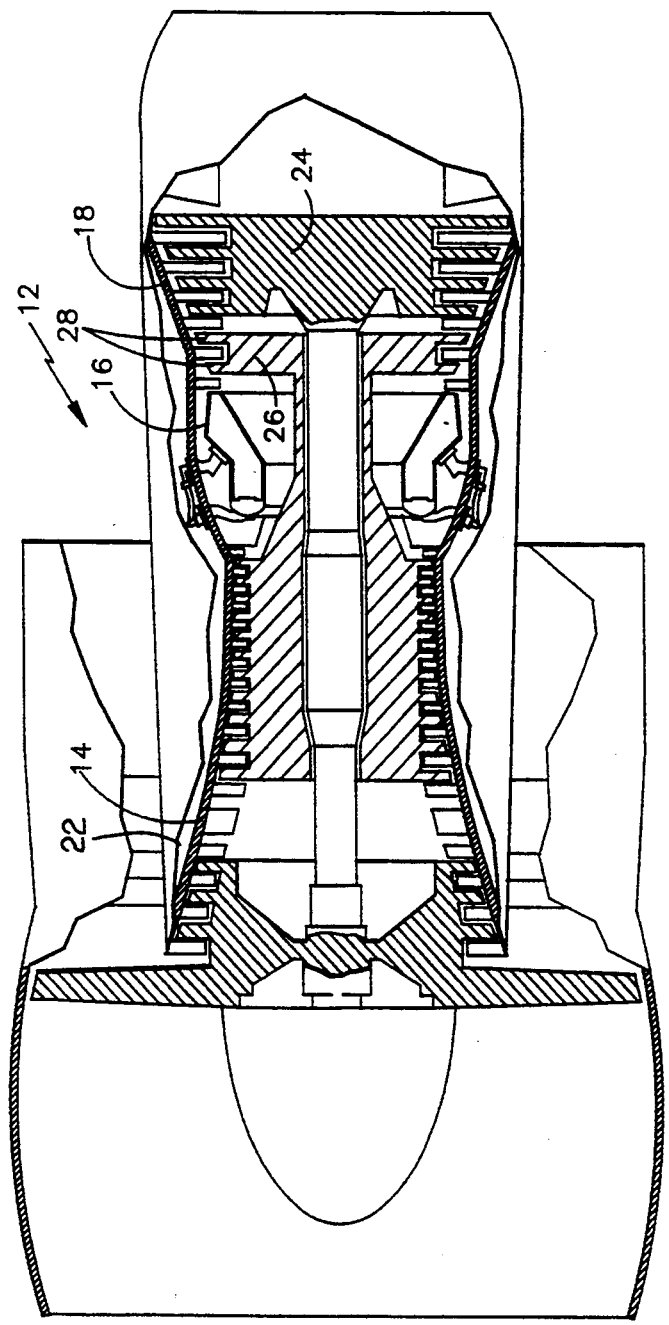
FIG. 1 is a cross sectional side view of a gas turbine engine.

Illustrated in FIG. 1 is an axial flow gas turbine engine 12 shown to illustrate a typical turbomachine. The gas turbine engine includes a compressor 14, a combustor 16, and a turbine 18. An annular axially directed flowpath 22 extends through the gas turbine engine and defines a passage for working fluid to pass sequentially through the compressor, combustor, and turbine. The turbine includes a plurality of rotor assemblies 24 comprised of a disk 26 and a plurality of rotor blades 28 disposed circumferentially about the rotor disk.

Each rotor blade, as shown in FIG. 2, includes an airfoil portion 32, an integral platform 34, and a root portion 36. The airfoil portion is aerodynamically shaped and extends radially through the flowpath. The airfoil portion engages the working fluid flowing through the flowpath to transfer energy from the working fluid to the disk. The platform extends laterally outward from the rotor blade and is disposed radially between the airfoil portion and the root portion. The platform includes an outer surface 38 which defines a radially inner flow surface for the working fluid flowpath. The root portion is radially inward of the platform and the airfoil portion, and provides means to engage the rotor blade with the disk (not shown in FIG. 2). The rotor blade also includes a core passage 42 (see FIG. 3) which extends through the root portion and the airfoil portion to provide a flow path for cooling fluid to flow through the rotor blade. The cooling fluid provides means to cool the surfaces of the airfoil portion which are exposed to the hot working fluid.

A fillet 44 is disposed about the radially inward end 46 of the airfoil portion at the juncture of the airfoil portion and the platform. The fillet provides means to minimize stress concentration along the juncture of the platform and airfoil portion. Additionally, the fillet provides an aerodynamically smooth juncture between an airfoil portion and platform.

A plurality of cooling passages 48 extend from the core 42 of the airfoil portion to the underside 52 of the platform. These cooling passages provide means to cool the fillet. Each cooling passage has an inlet 54 providing fluid communication between the core and the cooling passage and an outlet 56 providing fluid communication between the cooling passage and a damper cavity 58 disposed radially inward of the platform. The cooling passage defines a flowpath for cooling fluid to pass from the airfoil core through the fillet region and then into the damper cavity.

The cooling passage is oriented such that it is nearest to the cross-sectional midpoint 68 of the fillet to provide maximum cooling effectiveness to the flow surface of the fillet. Each cooling passage includes a streamwise axis 72 which is parallel with a tangent 74 of the cross-sectional midpoint of the fillet. This ensures that the cooling passage is nearest the midpoint of the fillet and also minimizes the impact of the cooling passage on the allowable stress in the fillet area.

During operation of the gas turbine engine, the rotor assembly rotates about the longitudinal axis of the gas turbine engine. Hot working fluid exiting the combustor flows through the turbine and engages the airfoil portion of the blades. Engagement with the hot working fluid heats up the airfoil portion, the fillet, and the platform. Rotational forces cause stress in the cantilevered platform, especially in the region of the fillet near the flow surface side of the fillet. The combination of the high stress and the high temperature environment, which lowers the allowable stress of the materials used in the rotor blade, may lead to cracking in the fillet.

Cooling fluid flows radially outward through the core passage and into the airfoil section of the blade and will provide cooling to the airfoil flow surfaces which have been heated by the working fluid. A portion of this cooling fluid flows to the cooling passages. This cooling fluid, due to the proximity of the cooling passage to the fillet flow surface, provides convective cooling to the fillet. This convective cooling cools the fillet to prevent overstressing and cracking of the fillet flow surface.

Cooling fluid flows through the cooling passage in a laterally outward and radially inward direction from the core to the damper cavity. Since the core cooling fluid is flowing in a radially outward direction in the region of the inlet (i.e. in an opposite radial direction), the flow rate of cooling fluid through the cooling passage is therefore dependent upon the static pressure difference between the core and the damper cavity. The core typically receives a supply of high pressure and relatively cool fluid. The damper cavity, however, receives a supply of cooling fluid which has been used to cool other structure within the turbine and has arrived at the damper cavity through a more tortuous flowpath. The fluid within the damper cavity therefore, is typically at a lower pressure and higher temperature than the core cooling fluid. Therefore, a positive static pressure differential exists between the core and the damper cavity and cooling fluid will then flow from the core to the damper cavity. Orienting the cooling passage as thus described provides means to avoid blockages within the cooling passage by minimizing the ingestion of particles into the cooling passage. Such particles may be present in the cooling flow entering the core passage. By orienting the cooling passage to flow in direction having a velocity component opposite to the principle direction of flow of the core passage, particles in the cooling fluid will generally flow past the inlet and continue on through the core passage.

The cooling fluid flowing through the cooling passage then exits the outlet and enters the damper cavity. Cooling fluid entering the damper cavity may perform several functions. First, the cooling fluid will provide cooling to the nearby structure around the damper cavity including the damper and the platform. Second, the cooling fluid will help pressurize the damper cavity to prevent the ingestion of working fluid into the damper cavity. Working fluid passing over the platforms is typically at a lower pressure than the core cooling fluid and this will cause a general outflow of cooling fluid between adjacent platforms. Third, cooling fluid flowing outward of the damper cavity between adjacent platforms will flow over those platforms and provide additional cooling to the laterally outward edges of the platforms. If desired, platform cooling holes (not shown) may be used to provide film cooling over the radially outward surface of the platform by providing a means of fluid communication between the damper cavity and the flow surface of the platform.

The cooling passages, as shown in FIG. 2, are disposed near the leading edge of the airfoil portion. Typically, the leading edge of the airfoil portion is a region of very high temperature because of contact with hot working fluid. Experience has shown that this is a region where cracking of the fillet is most prevalent. It should be noted, however, that the cooling passages may be located along other portions of the fillet and, if necessary, may be distributed throughout the fillet region. The shape of the cooling passages, as shown in FIGS. 2 and 3, are circular in cross-section. Although the cooling passages may be of other cross-sectional shapes, circular cross-sectional shapes are the simplest to produce with conventional drilling methods. The size of the core passages is dependent upon the cooling required and the stress level in the fillet. Although larger cooling passages may provide more cooling, the additional cooling is balanced against the need to prevent minimize stress concentration in the fillet.

Since the stress in the platform is encouraging the lateral edges of the platform to bend radially outward, the stress in the region of the fillet flow surface is generally compressive. In the region near the cross-sectional midpoint of the fillet the compressive stress has a direction which is parallel with a tangent to this midpoint. By orienting the longitudinal axis of the cooling passages to be aligned with the tangent, the effects of the cooling passage on the stress in the fillet is minimal. Although manufacturing and design constraints may not permit the cooling passages to be precisely parallel with the tangent, benefits of the cooling passage may be obtained with the cooling passages oriented in the direction of the tangent. It is suggested that the longitudinal axis of the cooling passage be within thirty degrees (30°) of parallel with the tangent.

Although the invention has been shown and described with respect with exemplary embodiments thereof, it should be understood by those skilled in the art that various changes, omissions, and additions may be made thereto, without departing from the spirit and scope of the invention.

What is claimed is:

1. A rotor blade for an axial flow turbine engine, the turbine engine having an annular flow path disposed about a longitudinal axis, the rotor blade including:
    an airfoil portion extending through the flow path, the airfoil portion including a core passage defining a flow path for flowing cooling fluid through the blade;
    a platform extending laterally outward from a junction with the blade and disposed radially inward of the airfoil portion, the platform including a radially inward facing surface defining in part an under platform cavity and a radially outward facing surface defining a flow surface for the annular flow path;
    a fillet extending about the junction between the platform and the airfoil portion, the fillet including a flow surface facing the flow path, the flow surface having a cross-sectional midpoint; and
    a cooling passage extending between the core passage and the under platform cavity, the cooling passage having an inlet permitting fluid communication between the core passage and the cooling passage, and an outlet disposed in the radially inward facing surface, wherein the cooling passage defines a flowpath for cooling fluid to flow from the core passage to the under platform cavity, and wherein heat is connectively exchanged between the fillet and the cooling fluid flowing through the cooling passage.

2. The rotor blade according to claim 1, wherein the cooling passage includes an axis extending in the direction of flow through the cooling passage, and wherein the axis is oriented in the direction of a line tangent to the cross-section midpoint.

3. The rotor blade according to claim 1, wherein the cooling passage axis is aligned with the direction of stress within the fillet during operation of the turbine engine.

4. The rotor blade according to claim 1, wherein the cooling passage is oriented to direct flow through the cooling passage with a velocity component directed opposite to the principle direction of flow within the core passage.

5. The rotor blade according to claim 2, wherein the cooling hole axis is within thirty degrees (30°) of parallel with the tangent.

6. The rotor blade according to claim 1, wherein the under platform cavity defines a damper cavity, and wherein cooling fluid exiting the cooling passage provides cooling to the damper cavity.

7. The rotor blade according to claim 3, wherein the cooling passage is oriented such that cooling flow is directed to flow through the cooling passage with a velocity component directed opposite to the principle direction of flow within the core passage.

8. The rotor blade according to claim 5, wherein the cooling passage is oriented such that cooling flow is directed to flow through the cooling passage with a velocity component directed opposite to the principle direction of flow within the core passage.

* * * * *

UNITED STATES PATENT AND TRADEMARK OFFICE
CERTIFICATE OF CORRECTION

PATENT NO. : 5,340,278

DATED : August 23, 1994

INVENTOR(S) : John W. Magowan

It is certified that error appears in the above-identified patent and that said Letters Patent is hereby corrected as shown below:

Column 4, line 67 after "component" insert --80--.
Column 4, line 68 after "direction" insert --82--.

Signed and Sealed this

Nineteenth Day of September, 1995

*Attest:*

BRUCE LEHMAN

*Attesting Officer*     *Commissioner of Patents and Trademarks*